Inventor
Charles E. Cleland

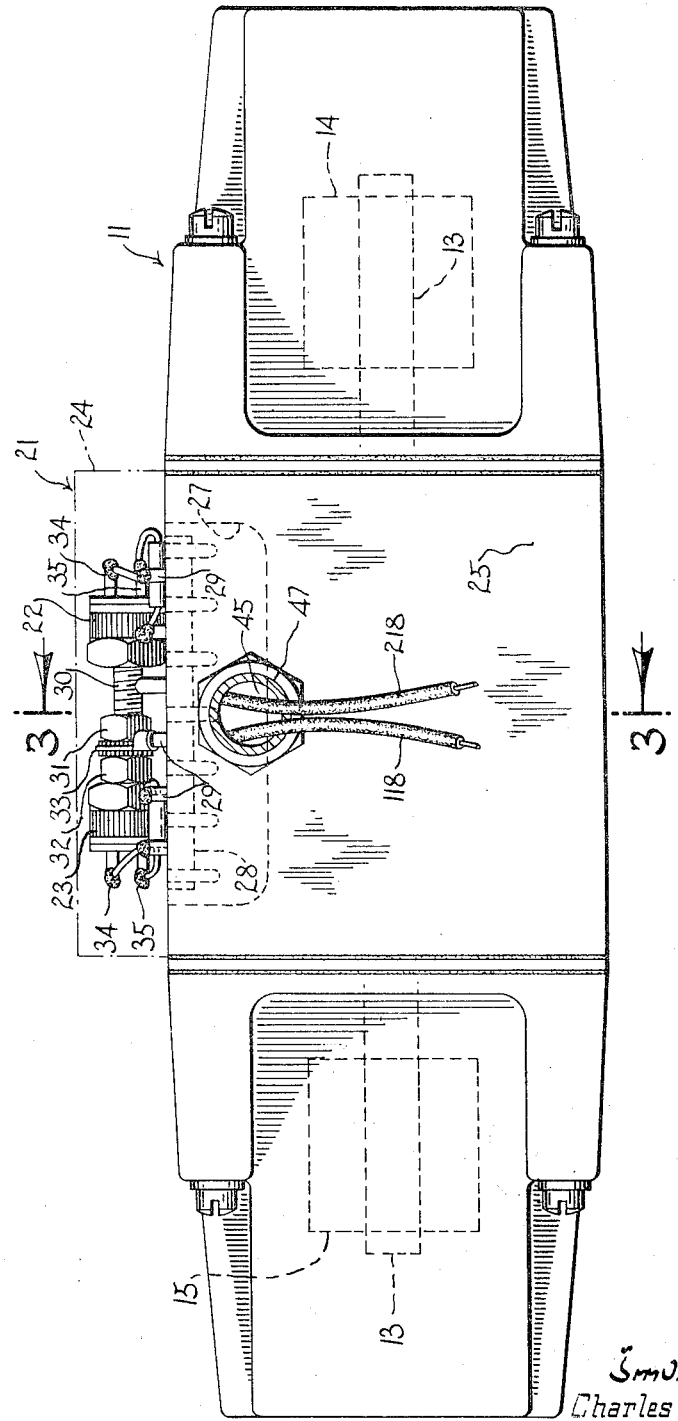

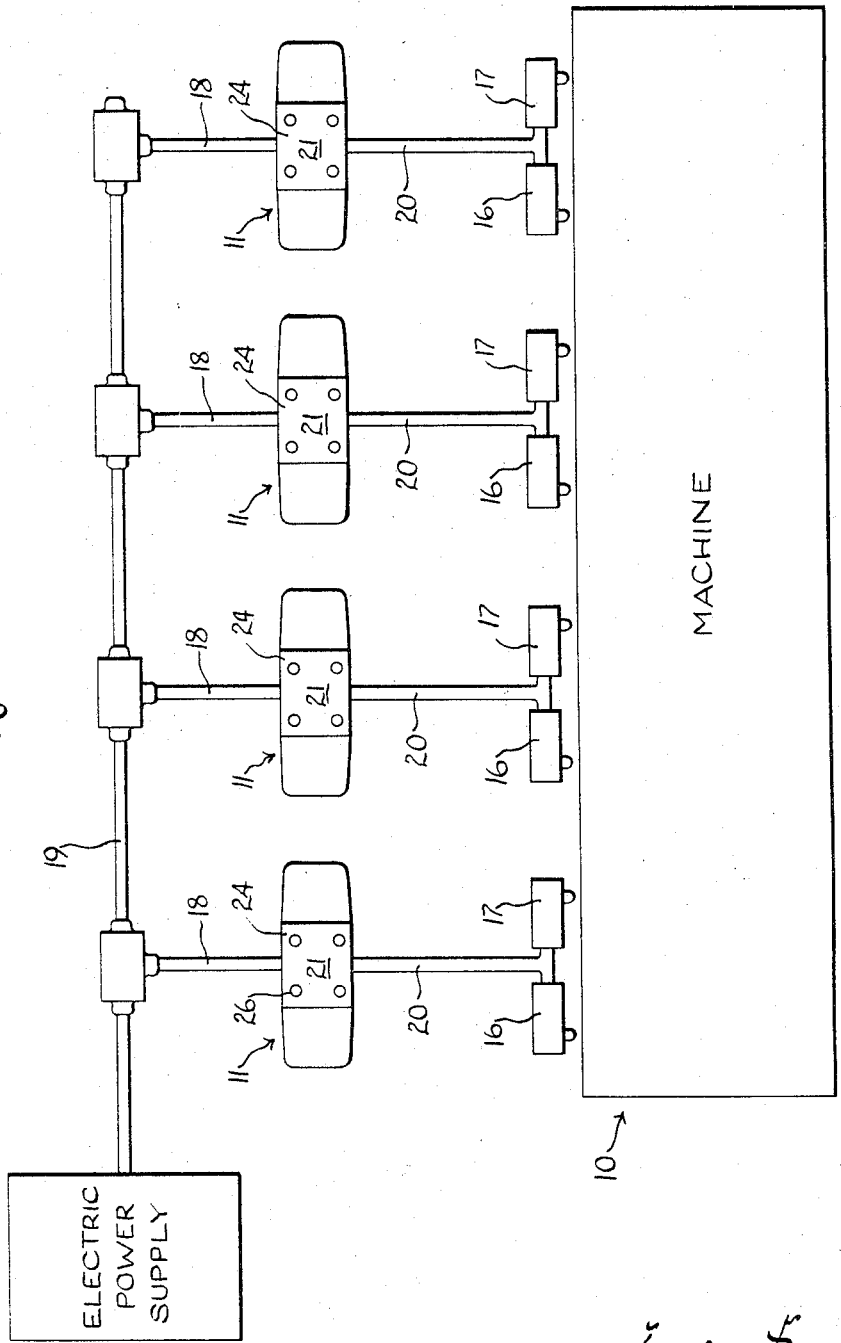

United States Patent Office
3,441,056
Patented Apr. 29, 1969

3,441,056
REMOTELY CONTROLLED PRIME MOVER
Charles E. Cleland, Edina, Minn., assignor to Continental Machines, Inc., Savage, Minn., a corporation of Minnesota
Filed Feb. 15, 1967, Ser. No. 616,307
Int. Cl. H02j 13/00; F16l 31/02
U.S. Cl. 137—625.65       8 Claims

ABSTRACT OF THE DISCLOSURE

A solid state switching device is mounted on each of a battery of the electrically operated prime movers that effect the different work functions of a machine tool, and renders its prime mover operative at the dictate of a low voltage program control switch located distant from the prime mover.

---

This invention relates to remotely controllable prime movers, and has more particular reference to improvements in the remote control of electric motors and especially the solenoids of solenoid actuated valves.

Solenoid actuated valves are commonly employed to govern the operation of hydraulic cylinders such as are incorporated in modern machine tools to effect the different working functions of the machine. They are superior to manually actuated valves in the sense that they can be located desirably close to the cylinders controlled thereby while enabling the various steps of a work cycle of the machine to be initiated and terminated in consequence of actuation of switch instrumentalities located at stations remote from the valves. The switch instrumentalities, for instance relay actuated switches, were usually mounted somewhere near the main electrical power supply, as on a wall panel. These relay actuated switches, in turn, were often controlled by pilot switches actuated by some moving part on the machine tool.

Power lines large enough to carry the current needed for energization of the solenoids of the solenoid actuated valves were run to the latter from their relay actuated switches; and secondary or control conductors were employed to connect the control switches with the coils of the relay actuated switches.

Because the solenoid actuated valves and their relay actuated switches, as well as the pilot or control switches governing the relays were heretofore all located at stations quite remote from one another, it was necessary to not only provide separate lengthy power lines for each valve, but to also provide lengthy control conductors to connect each pilot switch with its associated relay actuated switch. This problem was particularly acute with machine tools of the type requiring several solenoid actuated valves and pilot controlled relay switches.

This was not the only objection, however, for relay actuated switches are known to possess certain disadvantages, chief among which are contact failures.

The object of the present invention is to overcome both of the above mentioned objections, partly through the substitution of solid state switching devices for the relay actuated switches heretofore employed to govern energization of the solenoids of solenoid actuated valves, and partly through an especially unique way in which the solid state switching devices and the solenoid actuated valves can be organized into a unitary assembly.

Accordingly, the objectives of this invention are realized by providing the housing of an electrically energizable prime mover, such as the solenoid of a solenoid actuated valve, with a cavity to accommodate all of the electrical connections necessary to effect energization of the solenoid from a power source under the control of a solid state switching device, and wherein the latter is mounted in an enclosure that is secured to the valve housing in a position closing the cavity to conceal and protect said electrical connections.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 2 is a side elevational view of the valve shown in FIGURE 1, illustrating the solid state switching device in position upon the valve housing;

Figure 1:
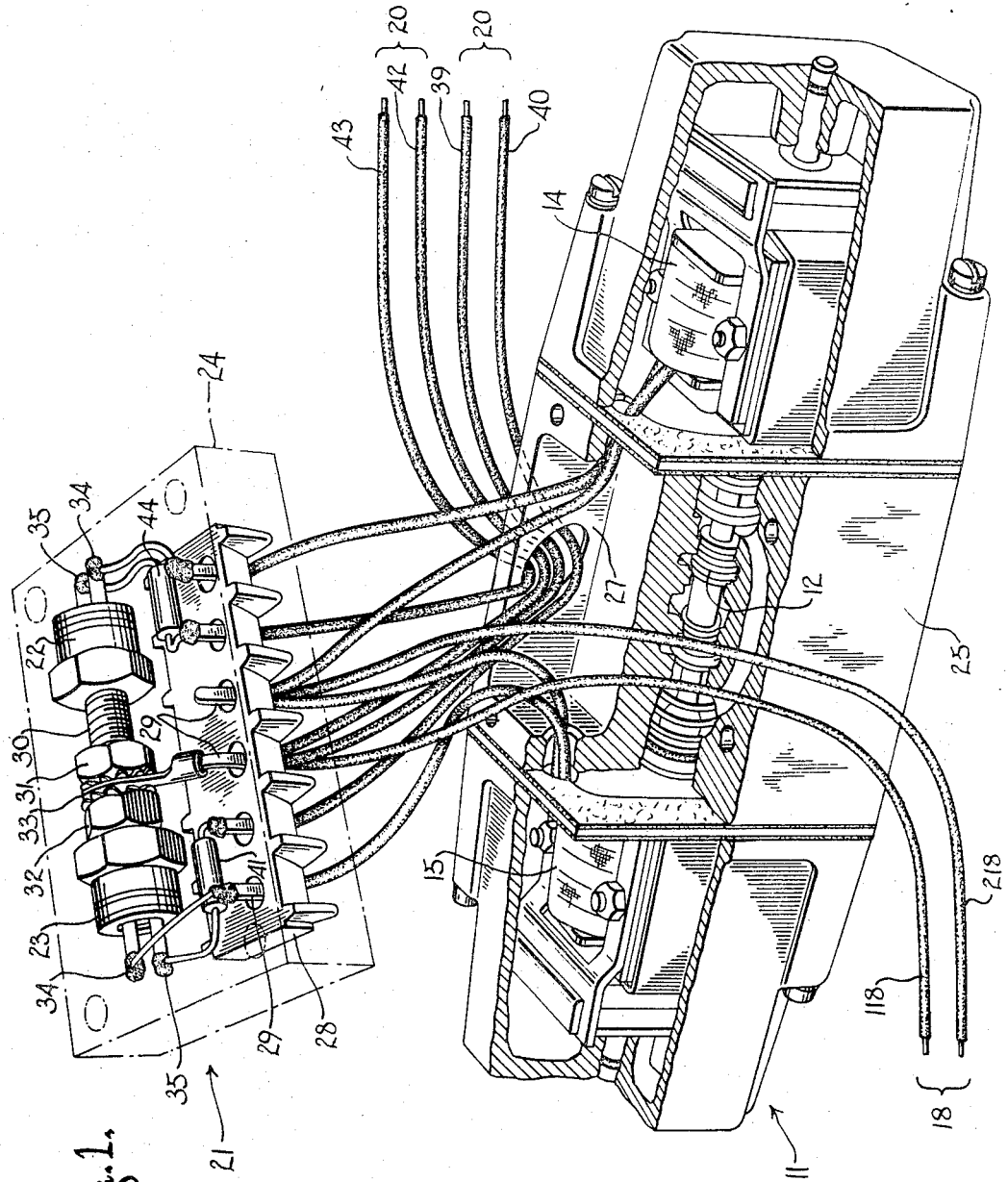
FIGURE 1 is a perspective view of a solenoid actuated valve, with parts of its housing broken away and in section, along with a solid state switching device shown displaced from its normal position upon the valve housing, and illustrating how electrical conductors are secured to a terminal board on the enclosure for the solid state switching device.
Figure 4:
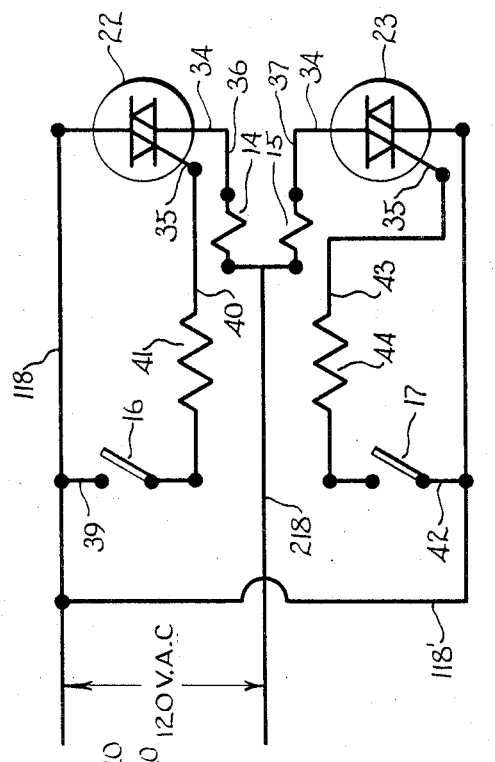

FIGURE 4 is an electrical diagram showing how energization of the solenoids of the valve is governed by the solid state switching device under the control of a pair of low voltage pilot switches; and FIGURE 5 is a diagram illustrating how this invention reduces the number and the length of the power and control lines needed to effect energization of the solenoids of a battery of solenoid operated valves for a machine tool or the like.

Refering now to the accompanying drawings, the numeral 10 in FIGURE 5 generally designates a machine tool of the type adapted to perform a number of work operations in a predetermined sequence during a work cycle of the machine. By way of example, the machine tool may be adapted to perform four work operations, each of which is carried out by a hydraulic cylinder, not shown. Each cylinder is governed by a solenoid actuated valve 11, here illustrated as of the type adapted to control a reversible hydraulic motor.

In general, the solenoid actuated valves are of conventional construction. Each has an axially movable valve element or spool 12 operatively connected at both ends with the armatures 13 of a pair of solenoids 14 and 15 so as to enable the spool to be shifted out of a neutral position to either of two working positions, depending upon which of the solenoids is energized.

Pilot or control switches 16 and 17 for the solenoids 14 and 15, respectively, of each valve are selectively actuatable to effect energization of their associated solenoids. These can be mounted on a control panel wherever desired, or they can be positioned on the machine to be actuated by moving parts thereof as suggested in FIGURE 5, so as to effect programming of the work operations throughout the work cycle of the machine.

According to this invention, the solenoid actuated valves 11 can be desirably located close to the cylinders controlled thereby and each of them can be supplied with current for energization of its solenoids through a substantially short power lead 18 joining with a common power supply line 19. In addition, a single two-conductor lead 20 is all that is required to connect each pilot switch 16–17 with its solenoid actuated valve, and these control leads can be quite short when the pilot switches are located to be actuated by moving parts on the machine as indicated in FIGURE 5.

These advantages are achieved through the provision of a switch unit 21, mounted on each of the solenoid actuated valves 11. Each of these units comprises a pair of solid state switching devices, namely silicon controlled rectifiers 22 and 23, one associated with each solenoid of the valve.

The switching unit 21, whether comprised of one or a pair of solid state switching devices for the control of valves having either one or two solenoids, is embedded in a block 24 of encapsulating material that is securable by screws 26 to the housing 25 enclosing the valve and its solenoids. The block 24 provides a cover for an upwardly opening recess 27 in the valve body, in which are accommodated all of the electrical connections between the power leads 18 and the control switches 16 and 17, the solid state switching devices 21 and 22 and the solenoids 14 and 15. To facilitate making these connections, a terminal board 28 is secured to the underside of the cover provided by the block 24. Solder lugs 29 projecting upwardly from the terminals of the terminal board are embedded in the encapsulating material of the cover 24, as seen best in FIGURE 3, to hold the board assembled with the cover.

Each of the solid state switching devices 22–23 is adapted to control the energization of one of the solenoids 14–15 at the dictate of its pilot switch 16 or 17, and thus serves the same function as the relay actuated switch heretofore used for that purpose. The switching devices of each switching unit are physically connected together with their anode defining mounting studs 30 coaxial and in end to end relation, by means of a nut 31 threadedly engaged with the adjacent end portions of both studs. The nut 31 cooperates with a second nut 32 on one of the studs to clamp a terminal member 33 therebetween. A conductor 118, which comprises one of the conductors of the power lead 18, is connected to the terminal member 33 through one of the terminals on the terminal board 28, and provides a common lead for the anodes defined by the studs 30 of both solid state switching devices. Conductor 118 is shown in the FIGURE 4 diagram as connecting with the stud defined anode of the switch device 22, and as having a branch 18' connecting with the corresponding anode of the switch device 23.

Two more terminals project from the end of each solid state switch device remote from its mounting stud. One of these is a second main circuit terminal 34 and the other is a gate circuit terminal 35. As seen in FIGURE 4, a conductor 36 connects the second main terminal 34 of switch device 22 with one end of solenoid 14, while a similar conductor 37 is connected between the second main terminal 34 of switch device 23 and one end of solenoid 15. The other ends of the solenoids 14 and 15 are commonly connected to the other conductor 218 of the power lead 18 at the terminal board.

The control or pilot switches 16–17 by which energization of the solid state switches 22 and 23 is governed, are connected in the low voltage gate circuits of the solid state switches in the manner seen in FIGURE 4. Thus, it will be seen that the lead 20 of the control switch 16 comprises a first conductor 39 which is connected to the power lead 118 (at the terminal board) and a second conductor 40 which is connected to the gate terminal 35 of switch device 22 through a resistance 41. In like manner, the lead 20 of pilot or control switch 17 comprises a first conductor 42 which is also connected to the power lead 118 by its branch 118', and a second conductor 43 connected to the gate terminal 35 of switch device 23 through a resistance 44.

As will be readily ascertainable from the FIGURE 4 diagram, actuation of the pilot switch 16 associated with any of the solenoid valves 11 to close the switch effects completion of the gate circuit of its respective solid state switch device 22. Switch device 22 then becomes operative to effect energization of the solenoid 14 controlled thereby.

Similarly, closure of the pilot switch 17 associated with any of the solenoid valves 11 effects completion of the gate circuit of its respective solid state switch device 23 which then causes energization of its associated solenoid 15.

In each case, of course, the solenoids are deenergized whenever their associated pilot switches 16 or 17 are opened.

Figure 3:
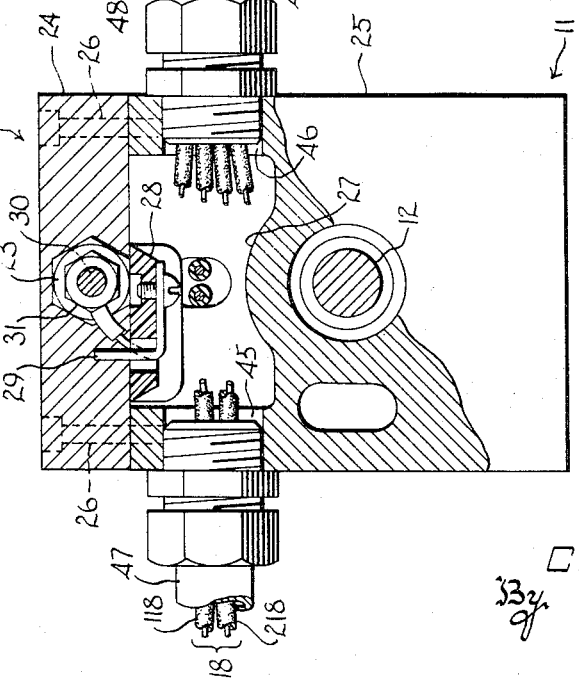
FIGURE 3 is an end view of the valve, but broken away and in cross section on the plane of the line 3—3 in FIGURE 2.

FIGURE 3 best illustrates that the housing 25 for each valve and its solenoids 14 and 15 has holes 45 and 46 opening to opposite sides thereof from its cavity 27. The power leads 118 and 218 enter the cavity 27 through the hole 45 for connection with their proper terminals on the terminal board 28; and the control leads 20 enter the cavity 27 through the hole 46 for connection of their conductors 39, 40, 42 and 43 with their respective terminals on the terminal board. As is customary these conductors are contained in conduits 47 and 48 that are secured to the housing in the conventional manner.

The solid state switching devices are highly advantageous because of their fast response, without arcing or noise, to the low voltage pilot switches controlling them. In addition they are immune to the mechanical shock and/or vibration resulting from response of the armatures to energization of their solenoids. The solid state switch devices thus have an exceptionally long life even under the most severe duty cycles.

From the foregoing description, together with the accompanying drawings, it will be readily apparent to those skilled in the art that this invention provides an exceptionally compact solenoid operated valve and control therefor, and that because of the use of solid state switching means in the control for the solenoids, the number and the length of the power lines and control leads needed for remote control of a number of such units is reduced to a minimum. It will also be apparent that a feature of the invention resides in the fact that the body or block of insulating material in which the solid state switching means are encapsulated, cooperates with the housing for the solenoid operated valve to provide a convenient enclosure for all of the electrical connections that must be made to the device.

What is claimed as my invention is:

1. A remotely controllable prime mover comprising the combination of:
   (A) an electric motor having a winding and having
       (1) a housing with a cavity opening to its exterior,
       (2) and cover means secured to the housing to form a part thereof and closing said cavity;
   (B) a terminal board in said cavity, said terminal board haivng terminals to which the motor winding leads are connected and to which a pair of power leads can be secured;
   (C) a solid state switching device enclosed within said cover means and having gate and main circuit leads secured to terminals on the terminal board in such relation to the motor winding leads that current flow in the gate circuit renders the main circuit effective pass current through the motor winding;
   (D) and a pilot switch located remote from the solid state switching device and having leads connected to terminals on the terminal board to govern current flow through the gate circuit.

2. The remotely controllable prime mover of claim 1, wherein said motor comprises a solenoid and an armature which moves in response to energization of the solenoid.

3. The remotely controllable prime mover of claim 2, further characterized by:
   (A) valve means in said housing adapted to control a fluid motor, said valve means having a movable valve element;

(B) and said valve element being operatively associated with said armature to be moved thereby to a working position in response to energization of the solenoid.

4. The remotely controllable prime mover of claim 3, wherein said cavity is located in a portion of the housing adjacent to the movable valve element.

5. The remotely controllable prime mover of claim 3, further characterized by:

(A) said housing comprising connected adjacent housing sections, one containing said valve means and the other containing the solenoid;

(B) and said cavity and the terminal board therein being located in the housing section containing the valve means.

6. The remotely controllable prime mover of claim 5, wherein said cover means comprises a block of encapsulating material in which the solid state switching device is embedded; and wherein the terminal board is secured to the underside of said block.

7. In a remotely controlled solenoid operated valve having a movable valve element and a solenoid with an armature operatively connected with said valve element to actuate the same upon energization of the solenoid, the improvement which comprises:

(A) a housing for the valve and the solenoid, said housing having a cavity opening to the exterior of the housing, the terminal ends of the solenoid extending into said cavity;

(B) a solid state switch device for connecting the solenoid with a source of power,
said solid state switch device having terminals by which it is connectible with power supply conductors and with the terminal ends of the solenoid, and having other terminals through which the solid state switch device is connectible with control lines leading from a remotely located control switch;

(C) a block of insulating material having the solid state switch device and its terminals embedded therein with a portion of each of said terminals exposed at one face of the block,
said block of insulating material being of a size to form a cover for the mouth of the cavity; and (D) means removably securing said block of insulating material to the housing in a position closing the mouth of the cavity and with said face thereof at which the terminals are exposed facing the interior of the cavity,
whereby said block cooperates with the walls of the cavity to form an enclosure for the electrical connections between said terminal portions and their respective conductors.

8. A remotely controllable prime mover comprising the combination of:

(A) an electric motor having a winding, and having
(1) a housing with a cavity opening to its exterior, and
(2) cover means secured to the housing to form a part thereof and close said cavity;

(B) a solid state switching device within said cover means and having gate and main circuit leads entering said cavity,
one of the main circuit leads being connected with the motor winding and the other being connectible with an electric power source so that with said other main circuit lead connected with a power source, energization of the gate circuit of said solid state switching device to render its main circuit conductive, results in energization of the motor winding and (C) a pilot switch remote from the solid state switching device,
said pilot switch being connected with the gate lead of the switching device and connectible with an electric power source so that closure of the pilot switch effects closure and energization of the gate circuit.

References Cited

UNITED STATES PATENTS 3,131,331  4/1964  Ray _____ 317—123
3,215,902  11/1965  Foley et al. _____ 317—123

M. CARY NELSON, *Primary Examiner.*

ROBERT J. MILLER, *Assistant Examiner.*